Sept. 30, 1947.  C. HOLLERITH  2,428,278
HYDRAULIC VALVE
Filed June 21, 1944  2 Sheets-Sheet 1
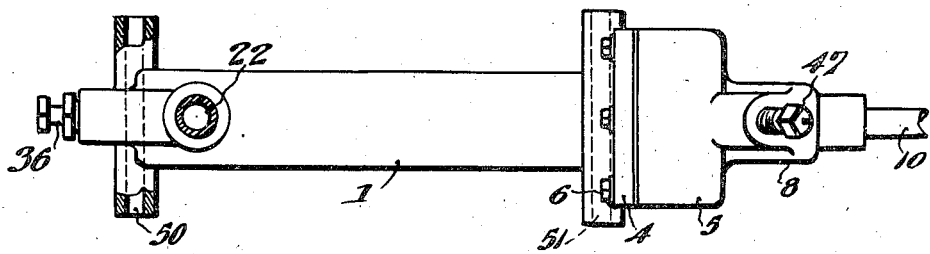
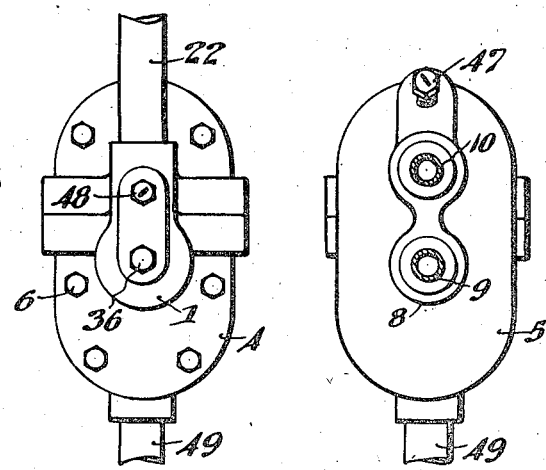
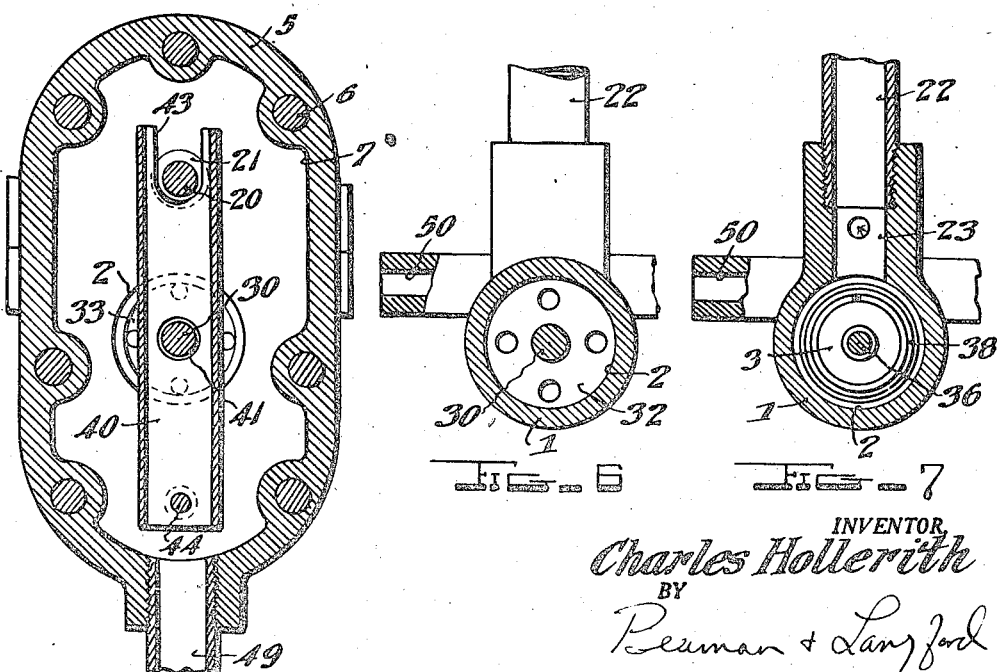
INVENTOR.
Charles Hollerith
BY
Beaman & Langford
ATTORNEYS Sept. 30, 1947.   C. HOLLERITH   2,428,278
HYDRAULIC VALVE
Filed June 21, 1944   2 Sheets-Sheet 2
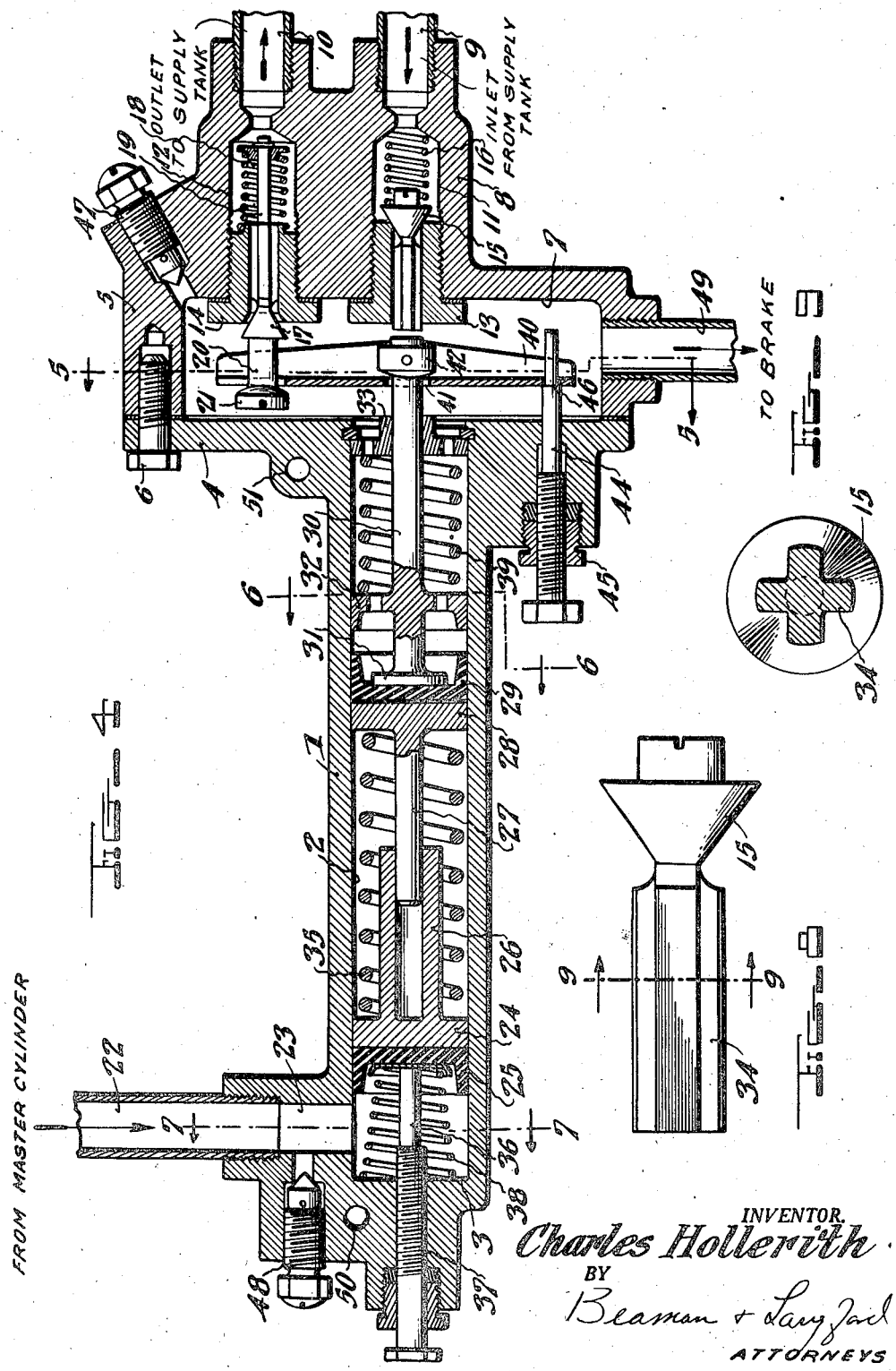
INVENTOR.
Charles Hollerith
BY
Beaman + Lary Jack
ATTORNEYS Patented Sept. 30, 1947

2,428,278

UNITED STATES PATENT OFFICE 2,428,278

HYDRAULIC VALVE

Charles Hollerith, Jackson, Mich., assignor, by mesne assignments, to The B. F. Goodrich Company, Akron, Ohio, a corporation of New York Application June 21, 1944, Serial No. 541,400

8 Claims. (Cl. 188—3)

My present invention relates to improvements in hydraulic valves, and particularly to a hydraulically or fluid operated inlet and outlet valve such as used in hydraulic brake systems and the like.

The primary purpose of this invention is to provide a valve structure that can be installed in the supply line from a source of pressure fluid to a brake or other mechanism to be intermittently operated by application of fluid pressure, and which valve structure permits quick opening of an inlet valve and relatively more rapid opening and rapid closing of a fluid outlet or return valve.

A further object is to so construct the valve parts that the operation will be substantially automatic when actuating fluid pressure is increased or decreased through the medium of the usual foot actuated brake pedal, or the like.

Another object is to so construct the parts that the degree of opening of the pressure fluid outlet valve can be varied and adjusted to meet or suit different conditions of use and operation.

A still further object is to provide a hydraulic or fluid valve structure for use in fluid brakes, which is of such construction that the amount of fluid displaced by the master cylinder or foot actuated compression means can be maintained at a minimum, and yet obtain completely successful and rapid actuation of the inlet valve and particularly the outlet valve as these lead from and return to the source of pressure fluid.

Yet another object is to so construct the parts that the inlet valve is substantially directly moved to the opened position, upon the application of pressure from or through a master cylinder or the like, and with which the outlet valve associated with the source of pressure fluid and the brake actuating means is proportionately rapidly opened and rapidly closed by interposition of motion increasing leverage means.

With the above and other objects in view, some of which will be apparent to those skilled in the art, and others of which are inherent in the construction and assembly and manner of use of the parts, my invention includes certain novel features of construction and certain novel arrangements and combinations of parts, which will be apparent from the following specification when taken with the accompanying drawings in which:

Fig. 1 is a view in side elevation of a valve including an embodiment of my invention.

Fig. 2 is a view in end elevation looking at the left hand end.

Fig. 3 is a view in end elevation looking toward the right hand end.

Fig. 4 is an enlarged longitudinal sectional view taken from end to end through the structure as shown in Fig. 1.

Fig. 5 is a transverse sectional view taken on line 5—5 of Fig. 4.

Fig. 6 is a transverse fragmentary sectional view on line 6—6 of Fig. 4.

Fig. 7 is a fragmentary sectional view taken on line 7—7 of Fig. 4.

Fig. 8 is an enlarged side elevational view of one of the pressure fluid control valves.

Fig. 9 is a transverse sectional view taken substantially on line 9—9 of the showing in Fig. 8.

The elongated valve casing 1 has a cylinder opening 2 extending longitudinally through the greater part thereof, the cylinder opening being closed at one end, as at 3, and being open at its opposite end. Around the open end of the cylinder opening 2, the housing 1 is widened or flanged, as at 4, and a fluid housing 5, connected on this flanged portion 4 by means of cap bolts 6, or other suitable fastenings, has a fluid chamber 7 therein. The housing 5 is preferably enlarged, as at 8, and a pressure fluid inlet pipe 9 is connected with this enlarged portion, a pressure fluid outlet pipe 10 being also connected with the enlarged portion at a location spaced or separated from the connection of the inlet pipe 9. Valve chambers 11 and 12 provide communication between the chamber 7 and the pipes 9 and 10 respectively, and valve seat bushings 13 and 14 are provided in these passages 11 and 12. An inlet valve 15, slidably fitted in the valve bushing 13, is normally held in closed relation by a spring 16. A pressure fluid outlet valve 17 is reciprocably mounted within the bore of the valve bushing 14 and is adapted to be closed by a spring 18 fitted around a stem 19 and exerting resilient force to urge the valve 17 to a closed or seated position. This valve 17 has a stem 20 extending therefrom into the chamber 7, to permit increases and decreases of fluid pressure through the pipe 22 to actuate the inlet and outlet valves 15 and 17. To this end, a piston 24 is slidably mounted within the cylinder opening 2 and is provided with a packing cup 25 faced toward the passage 23. This piston 24 has a stem 26 telescopically associated with the stem 27 on piston 28 also slidable within the cylinder opening 2, and having a packing cup 29 faced toward the open end of the cylinder opening. A stem 30 has a head 31 engaged by the inner end of piston 28, and this stem is provided with a guide slide portion 32 so that the stem may be reciprocated within the cylinder bore or opening 2. Stem 30 has its end passing outwardly from the open end of the cylinder bore or opening 2, and a guide member 33 is provided to maintain the stem substantially centered and yet permit free endwise movement thereof. The inlet valve 15 has the stem 34 thereof disposed so that the outer end of this stem will be engaged by the end of the stem 30.

The stems 26 and 27 of the piston portions 24 and 28 are substantially telescopically arranged or associated to permit relative movement of the two piston portions, and a coil spring 35 is provided to normally urge the piston portions 24 and 28 apart.

To provide a stop to prevent excessive movement of the piston portion 24, toward the left hand as the parts are shown in Fig. 3, I provide an adjusting bolt or screw 36 that is turned through a threaded opening 37 in the closed end 3 of the cylinder portion 1. This adjusting bolt 36 has a stem or extension that will be adjusted a proper distance from the closed wall or inwardly into the cylinder opening 2, to maintain the piston 24 in proper spacing from the end wall of the cylinder opening, thus insuring free movement of the parts. A coil spring 38, preferably of lighter and more resilient material than the spring 35, is disposed around the end of the stem 36 and is thus capable of exerting counter or balance pressure on the outer end of piston 24 to hold the parts against chattering or vibration when in use.

A coil spring 39 is disposed around the stem 30 between the slide portion 32 thereof and the guide member 33, this spring 39 being of sufficient strength to move piston 28 inwardly and to normally withdraw the end of the stem 30 from contact with the stem 34 of the valve 15, so that the spring 16 can function to normally close this inlet valve 15.

A valve operating lever 40, which is here shown as being substantially channel-shaped in cross section, but which can be of any desired shape and construction, has an opening 41 therethrough and a head 42 is provided on the stem 30 so that as this stem is moved to a retracted position by spring 39, the head 42 will engage the valve operating lever 40 to exert force tending to move this lever toward the left hand, as the parts are shown in Fig. 4. Lever 40 has an opening or bifurcation 43 at one end serving as a fork to fit around the stem 20 of outlet valve 17, and this portion of the lever has free movement or play between the head 21 and the valve 17. At its opposite end, lever 40 is provided with an opening which receives the extending end of an adjusting screw 44 having screw threaded adjustment through a packing gland 45, or through a screw threaded opening in the enlarged portion 4 at the open end of the cylinder 1.

This adjusting screw 44 is provided with a shoulder 46 serving as a fulcrum against which the end of the lever 40 abuts.

To permit servicing, it is desirable that bleeder screws or valves 47 and 48 be provided in communication with the chamber 7 and the passage 23, and it will of course be understood that the structure may be otherwise constructed to conform with standard practices in the brake art, or to meet special requirements or conditions.

The chamber 7 will receive fluid or liquid under pressure from a supply tank or accumulator, and a pipe 49 leads therefrom to the brake system, it of course being understood that this pipe 49 will also serve as a return pipe. My improved valve structure can be mounted and connected in various types of brake structures and systems, and a convenient means of mounting may be through bolts or pins received through the openings 50 and 51.

In the use of my improved valve structure, the amount of fluid displaced by the master cylinder can be maintained at a minimum required to exert the desired pressure on the piston 24, and the brake operating fluid or liquid will be supplied under pressure from a supply tank or accumulator, to enter the chamber 7 and from there flow through pipe 49 to the brake, in such quantities as may be required for proper brake application, the pipe 47 also serving as a return for the fluid from the brake through chamber 7 and outlet pipe 10. It will of course be understood that the pipe or tube 47 will serve as a pressure fluid supply to any brake system with which the present invention may be used, and when it is desired to apply the brakes, a foot pedal or other part operable to create fluid pressure through pipe 22 and passage 23 will be actuated. The fluid under pressure will flow through passage 23 into the closed end of cylinder 2, thus exerting pressure against piston 24 to move this piston to the right hand, and to subsequently accomplish the movement of the piston 28 and in consequence move the stem 30 toward the right hand, as the parts are viewed in Fig. 4, to bring the end of this stem into contact with the stem 34 of inlet valve 15, in consequence of which the valve 15 is opened to permit flow of pressure fluid from the inlet pipe 9 through chamber 7 and pipe 49 to the brakes. This movement of the stem 30 removes the head 42 thereof from contact with the lever 40, in consequence of which the upper end of lever 40 will swing to the right hand and permit spring 18 to close the outlet valve 17. As long as the end of the stem 30 exerts unseating pressure against the stem 34 of the valve 15, fluid under pressure will be supplied through the inlet pipe 9 from a supply tank or other source, and a constant head of pressure fluid, of any desired volume, will be available through pipe 49. When it is desired to release this pressure, the foot pedal or other means creating pressure through the passage 23 will be released and the springs 35 and 39 will restore the parts to the relation shown in Fig. 4, in consequence of which the head 42 on stem 30 is caused to contact the valve operating lever 40 to swing the same to engage the head 21 on stem 20 of valve 17 and move this outlet valve 17 to the open position, the shoulder at 46 acting or serving as a fulcrum. Immediately the stem 30 moves toward the left hand, as the parts are illustrated, the pressure on stem 34 of valve 15 will be released so that spring 16 moves the inlet valve 15 to the closed position. The lever 40 multiplies opening movement for the outlet valve, thus permitting rapid opening of the outlet valve when the inlet valve is closed, and it will of course be understood that the lever 40 is permitted multiplied movement in an opposite direction to allow the outlet valve 17 to close quickly.

While this invention has been described in a particular adaptation and installation, and the operation has been set forth as relating to this disclosure, it will be understood that the application and practice of the invention is not limited in these exact respects, and that my present invention can be employed in connection with many types and arrangements of brakes and brake systems. Therefore, it will be understood that the invention is capable of changes and variations from the presently illustrated single embodiment, without departing from the spirit and scope of my invention.

Having thus described my invention, what I desire to secure by Letters Patent and claim is:

1. A hydraulic valve structure for fluid brakes comprising a casing having a cylinder opening therein closed at one end, said casing being enlarged around the open end of the cylinder, a casing mounted on the enlarged end and provided with a fluid chamber, inlet and outlet pressure fluid connections to said fluid chamber, spring closed inlet and outlet valves at said inlet and outlet fluid connections, a stem endwise movable within the cylinder opening having the outer end thereof substantially aligned with the inlet valve, spring means normally holding said stem retracted from contact with the inlet valve, a pressure fluid connection at the closed end of the cylinder opening, piston means in the cylinder opening movable under fluid pressure from said connection to impart endwise movement to said stem to extend said stem into opening contact with the inlet valve, a valve operating lever within the fluid chamber fulcrumed at one end and having a connection at its opposite end with the outlet valve, and means on said stem engaging said valve operating lever in its middle portion when the stem is retracted under spring pressure thereby multiplying outlet valve opening movement of said lever.

2. A hydraulic valve structure for fluid brakes comprising a casing having a cylinder opening therein closed at one end, said casing being enlarged around the open end of the cylinder, a casing mounted on the enlarged end and provided with a fluid chamber, inlet and outlet pressure fluid connections to said fluid chamber, spring closed inlet and outlet valves at said inlet and outlet fluid connections, a stem endwise movable within the cylinder opening having the outer end thereof substantially aligned with the inlet valve, spring means normally holding said stem retracted from contact with the inlet valve, a pressure fluid connection at the closed end of the cylinder opening, piston means in the cylinder opening movable under fluid pressure from said connection to impart endwise movement to said stem to extend said stem into opening contact with the inlet valve, a valve operating lever within the fluid chamber fulcrumed at one end and having a connection at its opposite end with the outlet valve, means on said stem engaging said valve operating lever in its middle portion when the stem is retracted under spring pressure thereby multiplying outlet valve opening movement of said lever, a pressure fluid supply and return pipe connected with said fluid chamber, and means for adjusting the fulcrum of said outlet valve opening lever.

3. A hydraulic brake valve structure comprising an elongated casing having a cylinder opening therein closed at one end and opening to the opposite end of the casing, an enlargement upon the casing around the open end of the cylinder opening, a casing mounted on said enlargement and provided with a fluid chamber, a double piston operating means within the cylinder opening, a pressure fluid supply connection to the cylinder opening adjacent to the closed end thereof, a stem endwise movable in the open end of the valve chamber and having its end extending into the fluid chamber, a brake operating fluid supply and return connection to said fluid chamber, an inlet fluid supply connection to said chamber substantially aligned with the movable stem, an outlet fluid discharge connection from said chamber offset and spaced from the inlet supply connection, a spring closed inlet valve at said fluid inlet connection having a stem extended into proximity to and spaced from the stem when in retracted position, spring means normally urging said operating stem toward retracted position, a fluid outlet check valve at the fluid outlet connection from the fluid chamber, a valve operating lever fulcrumed at one end in said chamber and having a lost motion connection at its opposite end with the fluid outlet check valve, and a head on said stem engaging with the valve operating lever when said stem is retracted under force of the spring thereby swinging said lever and multiplying movement of the swinging end and consequently multiplying opening movement of the outlet check valve.

4. A hydraulic brake valve structure comprising an elongated casing having a cylinder opening therein closed at one end and opening to the opposite end of the casing, an enlargement upon the casing around the open end of the cylinder opening, a casing mounted on said enlargement and provided with a fluid chamber, a double piston operating means within the cylinder opening, a pressure fluid supply connection to the cylinder opening adjacent to the closed end thereof, a stem endwise movable in the open end of the valve chamber and having its end extending into the fluid chamber, a brake operating fluid supply and return connection to said fluid chamber, an inlet fluid supply connection to said chamber substantially aligned with the movable stem, an outlet fluid discharge connection from said chamber offset and spaced from the inlet supply connection, a spring closed inlet valve at said fluid inlet connection having a stem extended into proximity to and spaced from the stem when in retracted position, spring means normally urging said operating stem toward retracted position, a fluid outlet check valve at the fluid outlet connection from the fluid chamber, a valve operating lever fulcrumed at one end in said chamber and having a lost motion connection at its opposite end with the fluid outlet check valve, a head on said stem engaging with the valve operating lever when said stem is retracted under force of the spring thereby swinging said lever and multiplying movement of the swinging end and consequently multiplying opening movement of the outlet check valve, and means varying the setting of the fulcrum of the lever.

5. A hydraulic brake valve structure comprising an elongated casing having a cylinder opening therein closed at one end and opening to the opposite end of the casing, an enlargement upon the casing around the open end of the cylinder opening, a casing mounted on said enlargement and provided with a fluid chamber, a double piston operating means within the cylinder opening, a pressure fluid supply connection to the cylinder opening adjacent to the closed end thereof, a stem endwise movable in the open end of the valve chamber and having its end extending into the fluid chamber, a brake operating fluid supply and return connection to said fluid chamber, an inlet fluid supply connection to said chamber substantially aligned with the movable stem, an outlet fluid discharge connection from said chamber offset and spaced from the inlet supply connection, a spring closed inlet valve at said fluid inlet connection having a stem extended into proximity to and spaced from the stem when in retracted position, spring means normally urging said operating stem toward retracted position, a fluid outlet check valve at the fluid outlet connection from the fluid chamber, a valve operating lever fulcrumed at one end in said chamber and having a lost motion connection at its opposite end with the fluid outlet check valve, a head on said stem engaging with the valve operating lever when said stem is retracted under force of the spring thereby swinging said lever and multiplying movement of the swinging end and consequently multiplying opening movement of the outlet check valve, and spring means serving to normally resiliently exert force at said piston means to return the same to inoperative position and to hold the parts against casual movement.

6. A fluid valve structure for fluid brakes comprising, a fluid chamber, a brake fluid supply and return pipe connected with said chamber and adapted to be connected with a brake structure, fluid inlet and fluid outlet supply connections to said chamber, spring seated inlet and outlet valves, means movable to open the inlet valve, and a lever having a fulcrum at one end spaced away from both valves and said lever being actuated by return movement of the inlet valve opening means and swinging upon the fulcrum for multiplying opening movement of the outlet valve from the chamber.

7. A fluid actuated valve structure for fluid brakes comprising, a fluid chamber, a brake fluid supply and return pipe connected with said chamber and adapted to be connected with a brake structure, fluid inlet and fluid outlet supply connections to said chamber, spring seated inlet and outlet valves at said connections respectively, a stem endwise movable to open the inlet valve, a lever having a fulcrum at one end spaced away from both valves and said lever being actuatable by return movement of the inlet valve opening stem and swinging upon the fulcrum for multiplying opening movement of the outlet valve, a spring normally urging said stem to retracted returned position with the outlet valve open, and fluid actuated means operable to move said stem to inlet valve opening position.

8. A fluid valve structure for fluid brakes comprising, a fluid chamber, a brake fluid supply and return pipe connected with said chamber and adapted to be connected with a brake structure, fluid inlet and fluid outlet supply connections to said chamber, normally spring seated inlet and outlet valves at said inlet and outlet supply connections respectively, an endwise movable stem movable in one direction to open the inlet valve, fluid actuatable means to move said stem to inlet valve opening position, spring means normally urging said stem in an opposite direction, a lever having a fulcrum at one end spaced away from both valves and said lever being actuated by return movement of the inlet valve opening means and swinging upon the fulcrum for multiplying opening movement of the outlet valve, said lever at the end away from the fulcrum having a connection with the outlet valve, means on the stem engaging the lever intermediate its ends as the stem is retracted under spring force whereby movement of the outlet valve is multiplied by swinging of said lever upon the fulcrum, and means varying the setting of the fulcrum for the lever.

CHARLES HOLLERITH.

REFERENCES CITED

The following references are of record in the file of this patent:

UNITED STATES PATENTS

| Number | Name | Date |
| --- | --- | --- |
| 2,215,602 | Baade | Sept. 24, 1940 |
| 1,556,614 | Lane | Oct. 13, 1925 |
| 1,703,860 | Belitz | Mar. 5, 1929 |
| 2,096,491 | Hewitt | Oct. 19, 1937 |